FIG. I.

INVENTORS.
DONALD R. HUFFMAN,
ROBIN J. ROBINSON,
BY

ATTORNEY.

United States Patent Office 3,239,996
Patented Mar. 15, 1966

3,239,996
METHOD OF SEPARATING HELIUM FROM OTHER CONSTITUENTS OF NATURAL GAS
Donald R. Huffman, Riverside, Calif., and Robin J. Robinson, Houston, Tex., assignors to Humble Oil & Refining Company
Filed Mar. 18, 1963, Ser. No. 265,619
15 Claims. (Cl. 55—16)

This invention relates to the separation of helium from a mixture of gases, and more particularly to the separation of helium from methane and higher hydrocarbons by permeation through a thin, nonporous membrane.

The use of nonporous organic membranes for the purpose of separating different kinds of gases has been known for many years. A number of materials have been shown to have different permeabilities toward different gases so as to be effective in this technique. For use in effecting the separation of gases, such membranes should be chemically and physically stable, should have high absolute permeability in order to minimize the area of membrane required, and should have high selective permeability toward the desired gas in order to minimize the number of stages required to effect the desired purity and to minimize the power required for the separation.

At the present time the only commercially used method for the separation of helium from natural gas is low temperature liquefaction. One reason that the technique involving fractional permeation through membranes has not been used has been that the membranes tested for this use have not been found to have sufficiently high selectivity to helium. Among the materials that have been tested are ethyl cellulose, polystyrene, polyethylene, and diorgano polysiloxane rubbers. In accordance with the present invention, it has been found possible to substantially increase selective permeability toward helium by using as membranes, fluorinated polyolefin film, such as tetrafluoroethylene polymer film, that has been irradiated by radiation such as X-rays, beta rays, and gamma rays.

Figure 1:
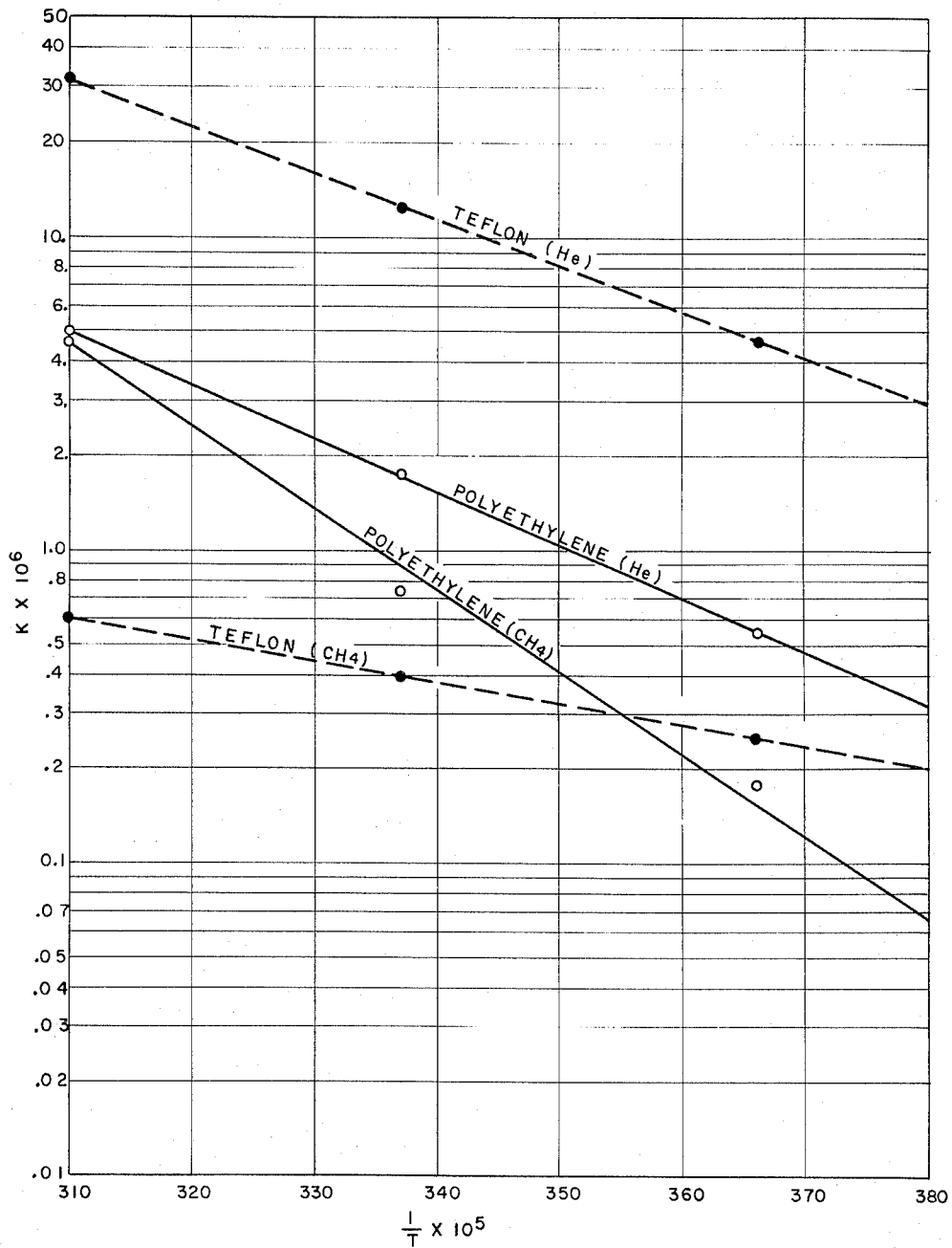
Figure 2:
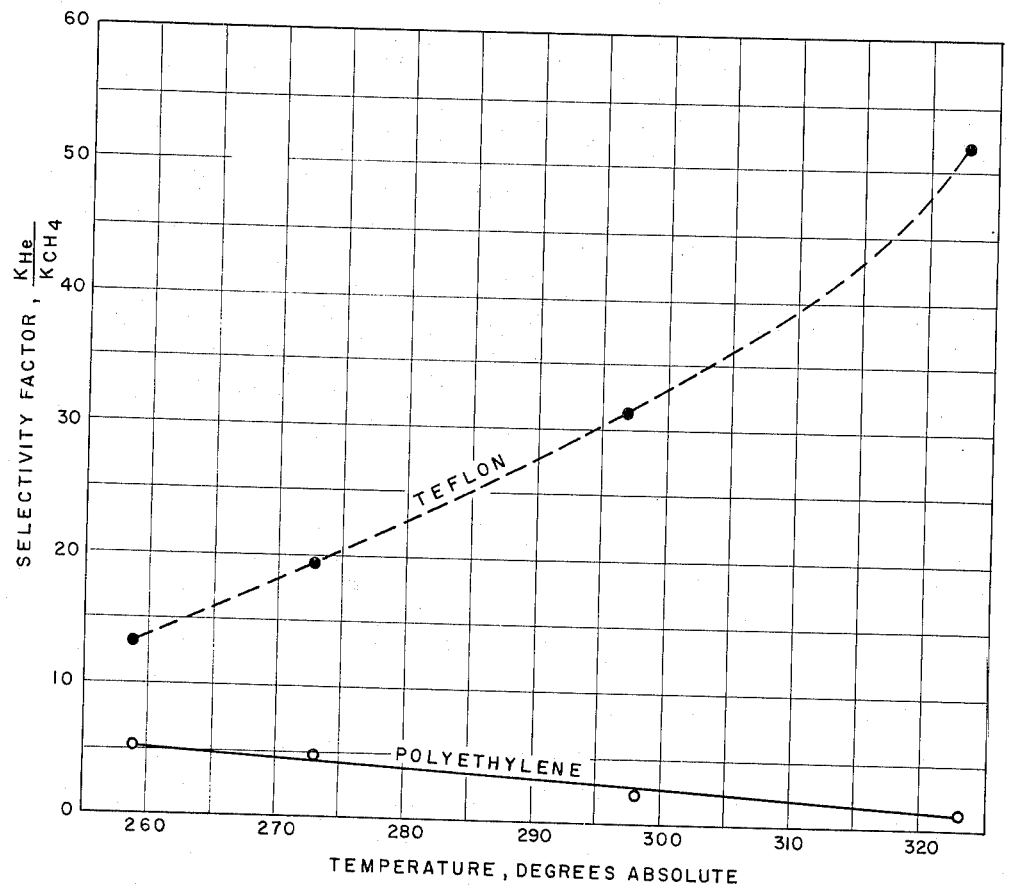

Objects and features of the invention not apparent from the above discussion will become evident upon consideration of the following more detailed description of the invention when taken in connection with the accompanying drawing, wherein:

FIG. 1 is a plot of permeability to methane and to helium as a function $1/T$ (where $T$ is absolute temperature) for irradiated polyethylene film and for irradiated tetrafluoroethylene polymer film; and FIG. 2 is a plot of the selectivity factor of irradiated tetrafluoroethylene film and of irradiated polyethylene film as a function of absolute temperature.

As mentioned above, the present invention utilizes membranes consisting of films of polymers of fluorinated polyolefins that have been irradiated. Examples of suitable fluorinated polyolefins are tetrafluoroethylene polymer and polytrifluoromonochloro ethylene. The amount of radiation should be between 1 and 200 megaroentgens per square centimeter, and preferably between 10 and 100 megaroentgens per square centimeter. The membranes should have a thickness of between 1 and 5 mils; a particularly desired thickness will be found to be 1.5 mils. The membranes may be used in cells such as are shown and described in the article New Diffusion Cell Design by J. O. Osburn et al., Industrial and Engineering Chemistry, April 1954, page 739, and in U.S. Patent No. 2,966,235—Kammermeyer. In both of these structures the gas to be separated is introduced into the cell on one side of the membrane, and gas that has permeated through the membrane is withdrawn from the cell on the other side of the membrane. Spent gas is withdrawn at a location remote from the inlet port on the same side of the membrane as that at which it was injected into the cell. More than one cell may be used; a system making use of a multiplicity of cells is described in the article Fractional Permeation Through Membranes by S. Weller et al., Chemical Engineering Progress, vol. 46, (1950) No. 11, page 585. In operation of a cell constructed as described in the references noted above, a pressure differential is effected across the membrane as by pressurizing the gas to be separated in the given cell, or by reducing the pressure on the outlet side of the membrane to below atmospheric. Inasmuch as the effectiveness of the separation will vary both in accordance with the pressure differential across the membrane and the temperature at which the separation is effected, it is desirable to keep the pressure differential between 50 and 1500 p.s.i. and to keep the temperature of the gas introduced into the cell at between ambient and about 300° F. Preferably, the gas pressure differential across the membrane should be about 750 p.s.i. and the temperature should be about 300° F.

As indicated above, gamma, beta, X radiation, or particles from a particle accelerator such as a Van der Graff accelerator, may be used to irradiate the membrane. Of the above types of radiation, gamma radiation is preferred for the reason that sources are readily available and have been used to irradiate films.

The effectiveness of the present invention will become apparent upon consideration of the results of the tests described below.

Using the techniques reported by Weller, supra, as a model, the absolute permeabilities to helium and methane of tetrafluoroethylene polymer and of various plastic films used in the prior art for separating gases were investigated. The results are tabulated below.

Table I

| Film | $K_{He} \times 10^6$ | $K_{CH_4} \times 10^6$ | $\alpha = \dfrac{K_{He}}{K_{CH_4}}$ |
|---|---|---|---|
| Teflon | 20 | 1.1 | 19 |
| Polyethylene | 3.2 | 1.8 | 1.7 |
| Polypropylene | 3.6 | 0.36 | 10 |
| Polystyrene | 7.2 | 0.72 | 10 |
| Ethyl Cellulose | 14.6 | 4.2 | 3.4 |
| Mylar | 0.53 | 0.18 | 3.0 |

The data shown in the above table indicate that Teflon is superior film for separating helium from methane. Teflon, which is tetrafluoroethylene polymer, has a permeability to helium of 20 with a selectivity factor of 19. Ethyl cellulose shows a reasonable permeability to helium, but the selectivity factor $\alpha$ is low. Polystyrene has a reasonable selectivity factor, but the permeability to helium is low. Polyethylene is the poorest of the tested films for separation of helium from natural gas, having both low permeability to helium and a low selectivity factor.

Thereafter, films of Teflon, polypropylene, and polyethylene were tested after being irradiated from a cobalt-60 source. Results of these tests are given in the following table, along with similar results for the non-irradiated film for comparison purposes.

Table II

| Film | $K_{He}$ | $K_{He}$Irr. | $K_{CH_4}$ | $K_{CH_4}$Irr. | $\alpha$ | $\alpha$-Irr. |
|---|---|---|---|---|---|---|
| Polypropylene | 3.6 | 0.69 | 0.36 | 0.017 | 10 | 40 |
| Polyethylene | 3.2 | 2.3 | 1.8 | 0.10 | 1.7 | 22 |
| Teflon | 20 | 13 | 1.1 | 0.19 | 19 | 70 |

From the above table it is again apparent that tetrafluoroethylene film is superior to the other films for the separation of helium from natural gas.

It has long been recognized that the passage of gases through nonporous films is a type of activated diffusion. This being the case, a plot of permeability as a function of $1/T$ (where T is the absolute temperature) on semi-log page should give a straight line. Accordingly, a series of tests were made using irradiated polyethylene films and using irradiated tetrafluoroethylene films at different temperatures. The results are shown in FIG. 1 and indicate that the process is truly one of activated diffusion. Also shown is the fact that the permeability to both helium and methane increases with temperature (higher temperatures being to the left on the graph) for both films as required by the nature of the process. It should be noted that the permeability to helium increased at a faster rate than did the permeability of methane through the tetrafluoroethylene polymer membrane. This is reversed with the polyethylene film, and this difference accounts for the fact that the selectivity factor increases with Teflon and decreases with polyethylene. In FIG. 2 the selectivity factor $\alpha$ is plotted as a function of absolute temperature. The curves on this figure show that there is a decided advantage to conducting the separation of helium from natural gas with an irradiated tetrafluoroethylene polymer film at the highest practical temperature. This contrasts with the separation when an irradiated polyethylene film is used in that the lowest temperature is best for polyethylene film.

The above description and examples of the invention are for the purpose of illustration, and it is not intended that the invention be limited except by the scope of the appended claims.

What is claimed is:

1. A method of separating helium from a gas mixture comprising major amounts of methane with minor amounts of helium and higher hydrocarbons than methane comprising:
   irradiating a thin membrane of fluorinated polyolefin film, contacting the irradiated film with said gas mixture under pressure to cause a portion of said gas mixture to permeate through said membrane from one side of said membrane to the other, and removin helium enriched gas mixture from the opposite side of said membrane.

2. A method of separating helium from a gas mixture comprising major amounts of methane with minor amounts of helium and higher hydrocarbons than methane comprising:
   irradiating a thin, nonporous tetrafluoroethylene membrane with gamma radiation;
   contacting one side of said membrane with said gas mixture and producing a differential pressure across said membrane; and
   removing helium enriched gas mixture from the opposite side of said membrane.

3. In a method of separating helium from a natural gas mixture consisting primarily of methane with lesser amounts of helium and higher hydrocarbons than methane wherein the gas mixture is brought into contact with at least one thin, nonporous tetrafluoroethylene membrane, the improvement comprising:
   irradiating said at least one tetrafluoroethylene membrane with from 10 to 100 megaroentgens per square centimeter of gamma radiation;
   producing a differential pressure across each membrane by pressurization of the gas exposed to one side of the membrane; and
   withdrawing helium enriched gas from the other side of said each membrane.

4. A method of separating helium from a gas mixture comprising major amounts of methane with minor amounts of helium and higher hydrocarbons than methane comprising:
   irradiating a thin, nonporous tetrafluoroethylene membrane, contacting the irradiated film with said gas mixture under pressure to cause a portion of said gas mixture to permeate through said membrane from one side of said membrane to the other, and removing helium enriched gas mixture from the opposite side of said membrane.

5. The method of claim 4 wherein the membrane is irradiated with from 1 to 200 megaroentgens per square centimeter of gamma radiation.

6. A method of separating helium from a gas mixture comprising major amounts of methane with minor amounts of helium and higher hydrocarbons than methane comprising:
   irradiating a thin membrane of fluorinated polyolefin film with gamma radiation;
   contacting one side of said membrane with said gas mixture and producing a differential pressure across said membrane; and
   removing helium enriched gas mixture from the opposite side of said membrane.

7. In a method of separating helium from a natural gas mixture consisting primarily of methane with lesser amounts of helium and higher hydrocarbons than methane wherein the gas mixture is brought into contact with at least one thin, nonporous membrane of fluorinated polyolefin film, the improvement comprising:
   irradiating said at least one polyolefin film membrane with from 10 to 100 megaroentgens per square centimeter of gamma radiation;
   producing a differential pressure across each membrane by pressurization of the gas exposed to one side of the membrane; and
   withdrawing helium enriched gas from the other side of said each membrane.

8. A method of separating helium from a gas mixture comprising major amounts of methane with minor amounts of helium and higher hydrocarbons than methane comprising:
   irradiating a thin, nonporous tetrafluoroethylene membrane with X radiation;
   contacting one side of said membrane with said gas mixture and producing a differential pressure across said membrane; and
   removing helium enriched gas mixture from the opposite side of said membrane.

9. In a method of separating helium from a natural gas mixture consisting primarily of methane with lesser amounts of helium and higher hydrocarbons than methane wherein the gas mixture is brought into contact with at least one thin, nonporous tetrafluoroethylene membrane, the improvement comprising:
   irradiating said at least one tetrafluoroethylene membrane with from 10 to 100 megaroentgens per square centimeter of X radiation;
   producing a differential pressure across each membrane by pressurization of the gas exposed to one side of the membrane; and
   withdrawing helium enriched gas from the other side of said each membrane.

10. A method of separating helium from a gas mixture comprising major amounts of methane with minor amounts of helium and higher hydrocarbons than methane comprising:
    irradiating a thin membrane of fluorinated polyolefin film with X radiation;
    contacting one side of said membrane with said gas mixture and producing a differential pressure across said membrane; and
    removing helium enriched gas mixture from the opposite side of said membrane.

11. In a method of separating helium from a natural gas mixture consisting primarily of methane with lesser amounts of helium and higher hydrocarbons than methane wherein the gas mixture is brought into contact with at least one thin, nonporous membrane of fluorinated polyolefin film, the improvement comprising:
  irradiating said at least one polyolefin film membrane with from 10 to 100 megaroentgens per square centimeter of X radiation;
  producing a differential pressure across each membrane by pressurization of the gas exposed to one side of the membrane; and
  withdrawing helium enriched gas from the other side of said each membrane.

12. A method of separating helium from a gas mixture comprising major amounts of methane with minor amounts of helium and higher hydrocarbons than methane comprising:
  irradiating a thin, nonporous tetrafluoroethylene membrane with beta radiation;
  contacting one side of said membrane with said gas mixture and producing a differential pressure across said membrane; and
  removing helium enriched gas mixture from the opposite side of said membrane.

13. In a method of separating helium from a natural gas mixture consisting primarily of methane with lesser amounts of helium and higher hydrocarbons than methane wherein the gas mixture is brought into contact with at least one thin, nonporous tetrafluoroethylene membrane, the improvement comprising:
  irradiating said at least one tetrafluoroethylene membrane with from 10 to 100 megaroentgens per square centimeter of beta radiation;
  producing a differential pressure across each membrane by pressurization of the gas exposed to one side of the membrane; and
  withdrawing helium enriched gas from the other side of said each membrane.

14. A method of separating helium from a gas mixture comprising major amounts of methane with minor amounts of helium and higher hydrocarbons than methane comprising:
  irradiating a thin membrane of fluorinated polyolefin film with beta radiation;
  contacting one side of said membrane with said gas mixture and producing a differential pressure across said membrane; and
  removing helium enriched gas mixture from the opposite side of said membrane.

15. In a method of separating helium from a natural gas mixture consisting primarily of methane with lesser amounts of helium and higher hydrocarbons than methane wherein the gas mixture is brought into contact with at least one thin, nonporous membrane of fluorinated polyolefin film, the improvement comprising:
  irradiating said at least one polyolefin film membrane with from 10 to 100 megaroentgens per square centimeter of beta radiation;
  producing a differential pressure across each membrane by pressurization of the gas exposed to one side of the membrane; and
  withdrawing helium enriched gas from the other side of said each membrane.

References Cited by the Examiner
UNITED STATES PATENTS

| 2,540,152 | 2/1951 | Weller | 55—16 |
| 2,981,680 | 4/1961 | Binning | 55—16 X |

OTHER REFERENCES

Norton, F. J.: Permeation of Gases Through Solids, in Journal of Applied Physics, 28 (1); pages 34–39, January 1957.

Charlesby, A.: Atomic Radiation and Polymers, N.Y., Pergamon Press, 1960, pages 348–358, QD 601 C5C.2.

REUBEN FRIEDMAN, *Primary Examiner.*